United States Patent
Alsop et al.

(10) Patent No.: US 11,693,725 B2
(45) Date of Patent: *Jul. 4, 2023

(54) DETECTING EXECUTION HAZARDS IN OFFLOADED OPERATIONS

(71) Applicant: ADVANCED MICRO DEVICES, INC., Santa Clara, CA (US)

(72) Inventors: Johnathan Alsop, Bellevue, WA (US); Shaizeen Aga, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/536,817

(22) Filed: Nov. 29, 2021

(65) Prior Publication Data
US 2022/0318085 A1 Oct. 6, 2022

Related U.S. Application Data

(63) Continuation of application No. 17/218,506, filed on Mar. 31, 2021, now Pat. No. 11,188,406.

(51) Int. Cl.
*G06F 11/07* (2006.01)
*G06F 11/24* (2006.01)
*G06F 11/14* (2006.01)

(52) U.S. Cl.
CPC ........ *G06F 11/0772* (2013.01); *G06F 11/141* (2013.01); *G06F 11/1471* (2013.01); *G06F 11/24* (2013.01)

(58) Field of Classification Search
CPC ............... G06F 11/0772; G06F 11/141; G06F 11/1471; G06F 11/24
USPC .............................................. 714/48
See application file for complete search history.

(56) References Cited

U.S. PATENT DOCUMENTS

| | | | |
|---|---|---|---|
| 8,407,454 B2 | 3/2013 | Berglas et al. | |
| 10,761,779 B2 | 9/2020 | Trika et al. | |
| 2002/0177989 A1 | 11/2002 | Alvarez et al. | |
| 2013/0019083 A1 | 1/2013 | Cain, III et al. | |
| 2017/0126568 A1 | 5/2017 | Lee et al. | |
| 2017/0177371 A1 | 6/2017 | Jones et al. | |
| 2020/0257555 A1 | 8/2020 | Underwood et al. | |
| 2020/0326949 A1 | 10/2020 | Vo et al. | |
| 2020/0366761 A1 | 11/2020 | Girbal | |
| 2020/0371856 A1 | 11/2020 | Zhang | |
| 2022/0253247 A1* | 8/2022 | Kim | G06F 3/0679 |
| 2022/0318015 A1* | 10/2022 | Alsop | G06F 9/3836 |

OTHER PUBLICATIONS

International Search Report and Written Opinion, PCT/US2022/021875, dated Jul. 19, 2022, 9 pages.

* cited by examiner

*Primary Examiner* — Chae M Ko

(57) ABSTRACT

Detecting execution hazards in offloaded operations is disclosed. A second offload operation is compared to a first offload operation that precedes the second offload operation. It is determined whether the second offload operation creates an execution hazard on an offload target device based on the comparison of the second offload operation to the first offload operation. If the execution hazard is detected, an error handling operation may be performed. In some examples, the offload operations are processing-in-memory operations.

20 Claims, 12 Drawing Sheets

US 11,693,725 B2

DETECTING EXECUTION HAZARDS IN OFFLOADED OPERATIONS

CROSS-REFERENCE TO RELATED APPLICATIONS

This application is a continuation application and claims priority from U.S. Pat. No. 11,188,406, issued Nov. 30, 2021.

BACKGROUND

Computing systems often include a number of processing resources (e.g., one or more processors), which may retrieve and execute instructions and store the results of the executed instructions to a suitable location. A processing resource (e.g., central processing unit (CPU) or graphics processing unit (GPU)) can comprise a number of functional units such as arithmetic logic unit (ALU) circuitry, floating point unit (FPU) circuitry, and/or a combinatorial logic block, for example, which can be used to execute instructions by performing arithmetic operations on data. For example, functional unit circuitry may be used to perform arithmetic operations such as addition, subtraction, multiplication, and/or division on operands. Typically, the processing resources (e.g., processor and/or associated functional unit circuitry) may be external to a memory array, and data is accessed via a bus or interconnect between the processing resources and the memory array to execute a set of instructions. To reduce the amount of accesses to fetch or store data in the memory array, computing systems may employ a cache hierarchy that temporarily stores recently accessed or modified data for use by a processing resource or a group of processing resources. However, processing performance may be further improved by offloading certain operations to a memory-based execution device in which processing resources are implemented internal and/or near to a memory, such that data processing is performed closer to the memory location storing the data rather than bringing the data closer to the processing resource. A memory-based execution device may save time by reducing external communications (i.e., processor to memory array communications) and may also conserve power.

DETAILED DESCRIPTION

Figure 1:
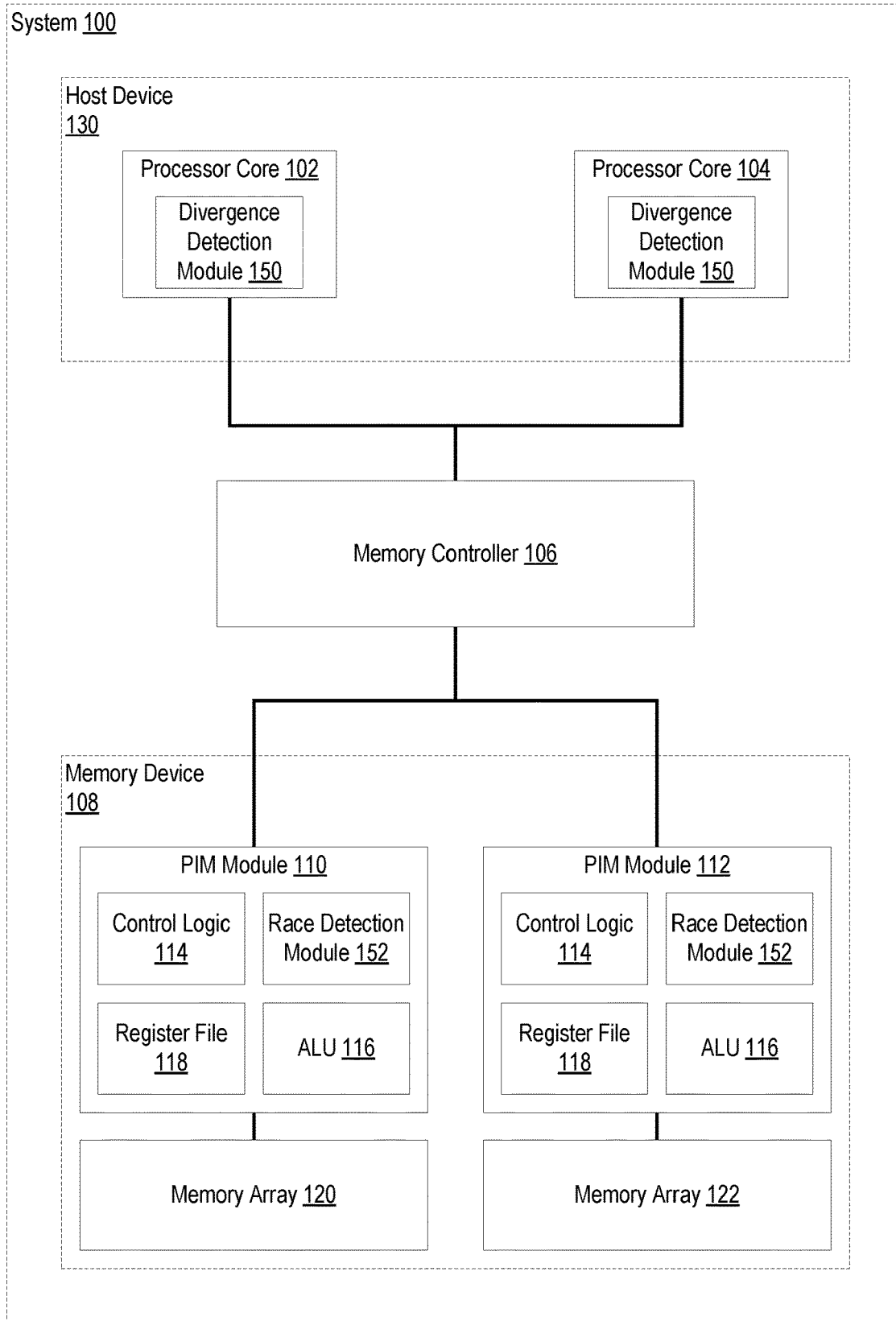
FIG. 1 sets forth a block diagram of an example system for detecting execution hazards in offloaded operations according to embodiments of the present disclosure.

As compute throughput scales faster than memory bandwidth, many techniques have been proposed to keep the growing compute capacity fed with data. Processing-in-memory (PIM) hardware moves compute close to memory, availing logic close to memory the benefit of higher memory bandwidth than that available to the host. As an example, a possible PIM configuration involves adding simple vector compute elements and local registers within each dynamic random access memory (DRAM) bank. The host processor can then send fine-grained commands (load to register, store from register, add, multiply accumulate, etc.) to be performed in this bank-local logic simply by specifying the target address. For operations that do not directly access memory, only the bank identifier bits of the address are needed to specify which PIM unit is being addressed. In such a configuration, PIM avoids transferring data across and bottlenecking the memory interface and is therefore able to increase achievable memory bandwidth and improve performance for a growing category of data-limited workloads.

However, PIM complicates the memory model for software development, requiring awareness of architecture-specific memory placement details in order to develop performant and functional applications. When a sequence of PIM operations target multiple addresses while operating on the same intermediate value in the memory-local register (e.g., a load+add[A]→R1 followed by a store of the R1→[B]), these addresses must be located in the same PIM memory partition. If this is not the case, the dependent PIM operations will map to a register in a different partition causing the program to fail, and the source of the failure may be very difficult to debug. For example, PIM execution units are generally placed at a certain level in the memory hierarchy (e.g., bank or channel). For a PIM execution unit to operate on two addresses, both addresses have to fall in the same memory hierarchy partition with which the PIM execution unit is associated (e.g., the memory addresses of the target operands must map to the same physical memory bank). When software assumptions about address to physical memory mapping do not match the realities of hardware (e.g., due to misconfiguration) or addressing errors occur, dependent PIM operations can be erroneously issued to the wrong memory banks, resulting in subtle memory or PIM register file corruptions that may be difficult to debug. Because this affects the values of data that may be stored or returned from memory, it represents a new complication to the memory model, requiring awareness of low-level hardware details for correct operation. The ability to detect these erroneous PIM operations early is therefore extremely important to ensuring programmability and portability in PIM software.

PIM also introduces a second related complication into the memory model regarding racy PIM accesses. Whenever a PIM command that addresses a bank-local register as a source or destination operand is issued, the specific register accessed is determined by the bank ID bits of the target memory address (in addition to the register ID bits of the specific PIM command). In order to issue multiple PIM commands from different cores in parallel (which may be necessary to exploit the bandwidth benefits of PIM), software must avoid issuing independent commands concurrently if they target the same bank and register as this could result in the corruption of intermediate data.

Detecting address mapping errors in a PIM system is a different problem to that of detecting illegal races or memory errors in a conventional multithreaded program. Because of the reliance on hardware mapping of memory, these types of PIM errors are thoroughly intertwined with the architecture and the mapping configuration. This awareness is a fundamental portability and programmability challenge of PIM software that does not exist for standard shared memory multithreaded programs, making the problem more difficult than simply detecting a data race between threads. For example, if a program written for one address mapping is directly executed on a new architecture with a different number of PIM modules or differently configured interleaving pattern, it may fail in a way that is only detectable at runtime. In contrast, data races in shared memory programs can be detected in a hardware-agnostic way. This makes the challenge of PIM mapping errors a much more difficult hurdle and more important to support with debugging.

To address the foregoing, embodiments in accordance with the present disclosure provide techniques and mechanisms for detecting potential mapping errors in offload operations targeting an offloaded execution device such as a PIM module. One example mapping error type is encountered when two PIM operations from a single thread are intended to map to the same PIM module, but they map to different modules. Another example mapping error type is encountered when two PIM operations from different threads are intended to map to different PIM modules, but they map to the same PIM module. Such mapping errors may give rise to execution hazards and incorrect execution in the offloaded execution device. The detection of these mapping errors facilitates identification of the violating instruction, enables increased programmability, improves confidence in portable PIM software, and significantly improves debugging.

An embodiment in accordance with the present disclosure is directed to a method of detecting execution hazards in offloaded operations. The method includes comparing a second offload operation to a first offload operation that precedes the second offload operation and determining whether the second offload operation creates an execution hazard on an offload target device based on the comparison of the second offload operation to the first offload operation. In some implementations, the method also includes initiating an error handling action in response to determining that the second offload operation creates the execution hazard on the offload target device. The error handling action may include sending an error message, creating an error log entry, or triggering a fault.

In some implementations, comparing a second offload operation to a first offload operation that precedes the second offload operation includes comparing a second offload target device identifier associated with the second offload operation to a first offload target device identifier associated with the first offload operation. In these implementations, determining whether the second offload operation creates an execution hazard on an offload target device based on the comparison of the second offload operation to the first offload operation includes detecting the execution hazard when the first offload target device identifier and the second offload target device identifier disagree.

In some implementations, the method may also include storing the first offload target device identifier in response to an indication that the first offload operation begins a sequence of dependent offload operations. In these implementations, comparing a second offload operation to a first offload operation that precedes the second offload operation includes identifying a sequence label of the second offload operation and identifying the first offload target device identifier based on the sequence label of the second offload operation.

In some implementations, comparing a second offload operation to a first offload operation that precedes the second offload operation includes comparing a second thread identifier associated with the second offload operation to a first thread identifier associated with the first offload operation. In these implementations, determining whether the second offload operation creates an execution hazard on an offload target device based on the comparison of the second offload operation to the first offload operation includes detecting the execution hazard in the offload target device when the first thread identifier and the second thread identifier disagree. In some implementations, the method also includes identifying that race detection is enabled on the offload target device. In these implementations, identifying that race detection is enabled on the offload target device may include storing the first thread identifier for first offload operation, wherein the first offload operation is associated with a race detection indicator.

In some implementations, the method also includes identifying a pattern of sequential offload instructions having the first offload target device identifier. In some examples, the second offload operation and the first offload operation are PIM operations. In these examples, the first offload target device and the second offload target device are PIM modules. In some implementations, comparing a second offload operation to a first offload operation that precedes the second offload operation and determining whether the second offload operation creates an execution hazard on an offload target device based on the comparison of the second offload operation to the first offload operation are performed at runtime.

Another embodiment in accordance with the present disclosure is directed to an apparatus for detecting execution hazards in offloaded operations. The apparatus includes logic circuitry configured to compare a second offload operation to a first offload operation that precedes the second offload operation and determine whether the second offload operation creates an execution hazard on an offload target device based on the comparison of the second offload operation to the first offload operation. In some implementations, the logic is also configured to initiate an error handling action in response to determining that the second offload operation creates the execution hazard on the offload target device. The error handling action may include sending an error message, creating an error log entry, or triggering a fault.

In some implementations, comparing a second offload operation to a first offload operation that precedes the second offload operation includes comparing a second offload target device identifier associated with the second offload operation to a first offload target device identifier associated with the first offload operation. In these implementations, determining whether the second offload operation creates an execution hazard on an offload target device based on the comparison of the second offload operation to the first offload operation includes detecting the execution hazard when the first offload target device identifier and the second offload target device identifier disagree.

In some implementations, comparing a second offload operation to a first offload operation that precedes the second offload operation includes comparing a second thread identifier associated with the second offload operation to a first thread identifier associated with the first offload operation. In these implementations, determining whether the second offload operation creates an execution hazard on an offload target device based on the comparison of the second offload operation to the first offload operation includes detecting the execution hazard in the offload target device when the first thread identifier and the second thread identifier disagree.

Yet another embodiment in accordance with the present disclosure is directed to a system for detecting execution hazards in offloaded operations that includes two or more processor cores, two or more processing-in-memory (PIM) modules, and logic circuitry configured to compare a second offload operation to a first offload operation that precedes the second offload operation and determine whether the second offload operation creates an execution hazard on an offload target device based on the comparison of the second offload operation to the first offload operation. In some implementations, the logic is also configured to initiate an error handling action in response to determining that the second offload operation creates the execution hazard on the offload target device. The error handling action may include sending an error message, creating an error log entry, or triggering a fault.

In some implementations, comparing a second offload operation to a first offload operation that precedes the second offload operation includes comparing a second offload target device identifier associated with the second offload operation to a first offload target device identifier associated with the first offload operation. In these implementations, determining whether the second offload operation creates an execution hazard on an offload target device based on the comparison of the second offload operation to the first offload operation includes detecting the execution hazard when the first offload target device identifier and the second offload target device identifier disagree.

In some implementations, comparing a second offload operation to a first offload operation that precedes the second offload operation includes comparing a second thread identifier associated with the second offload operation to a first thread identifier associated with the first offload operation. In these implementations, determining whether the second offload operation creates an execution hazard on an offload target device based on the comparison of the second offload operation to the first offload operation includes detecting the execution hazard in the offload target device when the first thread identifier and the second thread identifier disagree.

Embodiments in accordance with the present disclosure will be described in further detail beginning with FIG. 1. Like reference numerals refer to like elements throughout the specification and drawings. FIG. 1 sets forth a block diagram of an example system 100 for detecting execution hazards in offloaded operations in accordance with the present disclosure. The example system 100 of FIG. 1 includes two or more processor cores 102, 104. In various examples, the processor cores 102, 104 are CPU cores or GPU cores of a host device 130 configured to host single-threaded or multithreaded applications. For example, the host device 130 may host a multithreaded application such that respective processor cores 102, 104 execute respective threads of the multithreaded application. The processor cores 102, 104 implement an instruction set architecture that includes offload instructions for offloading operation to an offload target device. An offload instruction is completed by the processor cores 102, 104 when, for example, memory addresses associated with the offload instruction are resolved, operand values in processor registers are available, and memory checks have completed. The operation (e.g., load, store, add, multiply) indicated in the offload instruction is not executed on the processor core and is instead offloaded for execution on the offload target device. Once the offload instruction is complete, the processor core 102, 104 generates and issues an offload request or command that includes the offload operation, operand values and memory addresses, and other metadata. In this way, the workload on the processor cores 102, 104 is alleviated by offloading an operation for execution on a device external to or remote from the processor cores 102, 104.

For example, the offload operation may be a processing-in-memory (PIM) operation that that direct a PIM module to execute the operation on data stored in a PIM-enabled memory device. In such an example, operators of offload instructions may include load, store, and arithmetic operators, and operands of offload instruction may include PIM registers (i.e., registers local to the PIM module), memory addresses, and values from core registers or other core-computed values.

The system 100 also includes at least one memory controller 106 that is shared by the processor cores 102, 104 for accessing a memory device 108. While the example of FIG. 1 depicts a single memory controller 106, the system 100 may include multiple memory controllers each corresponding to a memory channel in the memory device 108. In some examples, the memory controller 106 is also used by the processor cores 102, 104 for offloading operations for execution by the offload target device. In these examples, the memory controller 106 generates, in response to an offload request generated by the processor cores 102, 104, an offload command for an offload operation that directs the offload target device to carry out the offload operation.

In some examples, the memory controller 106 and the host device 130 including processor cores 102, 104 are implemented on the same chip (e.g., in a System-on-Chip (SoC) architecture). In some examples, the memory device, the memory controller 106, and the host device 130 including processor cores 102, 104 are implemented on the same chip (e.g., in a System-on-Chip (SoC) architecture). In some examples, the memory device, the memory controller 106, and the host device 130 including processor cores 102, 104 are implemented in the same package (e.g., in a System-in-Package (SiP) architecture).

In the example system 100 of FIG. 1, the memory device 108 is a PIM-enabled memory device that includes two or more PIM modules 110, 112 that are exemplary offload target devices in that the PIM modules 110, 112 are configured to execute operations offloaded from the host device 130. The host device 130 and the PIM modules 110, 112 share access to the same data produced and consumed by an application executing on the host device 130. For example, this data may be data stored in memory arrays 120, 122 of the memory device 108 to which the PIM modules 110, 112 are respectively coupled. The PIM modules 110, 112 are characterized by faster access to data relative to the host device 130. In some examples, the PIM modules 110, 112 operate at the direction of the processor cores 102, 104 to execute memory intensive tasks. The memory arrays 120, 122 may be arrays of memory cells of a bank, arrays of banks, or other memory hierarchy partitions. For the purpose of explanation here, it is assumed that each PIM module 110, 112 is coupled to a respective memory bank (i.e., in the form of memory arrays 120, 122). Readers of skill in the art will appreciate that various configurations of PIM modules and memory partitions (physical or logical) in a PIM-enabled memory devices may be employed without departing from the spirit of the present disclosure.

In the example of FIG. 1, the PIM modules 110, 112 include control logic 114 for decoding instructions or commands issued from the processor cores 102, 104, an arithmetic logic unit (ALU) 116 that performs an offloaded operation (i.e., a PIM operation) indicated in the instruction or command, and a register file 118 for holding data that is read from or written to the memory arrays 120, 122. In some examples, the ALU 116 is capable performing a limited set of operations relative to the ALUs of the processor cores 102, 104, thus making the ALU 116 less complex to implement and more suited to in-memory application. A PIM operation may move data to or from PIM temporary storage (e.g., the PIM register file 118) and/or the memory arrays 120, 122, and it may also trigger near-memory computation on this data in the ALU 116. Each PIM operation carries a target address, which is used to direct it to the appropriate PIM module(s), and the operation to be performed, which may additionally specify a location in PIM temporary storage (e.g., register file 118). Each PIM module 110, 112 can operate on a distinct subset of the physical address space. When a PIM operation reaches a PIM module 110, 112, it is serialized with other PIM operations and memory accesses to the memory array 120, 122.

In the example system 100 of FIG. 1, it is possible that two PIM operations from a single thread executing on a processor core are intended to map to the same PIM module, but instead map to different PIM modules due to errors or misapprehensions in the mapping between memory addresses and memory banks or modules. For example, a mapping function is likely to change for different architectures giving rise to errors when porting code. Moreover, the mapping function may be dynamically programmed to optimize a data interleaving strategy for different workloads. Such errors are difficult to discover and debug. To simplify the process of programming, testing, and debugging new PIM software, it is beneficial to identify such divergent PIM operations.

To facilitate the programming, testing, and debugging of PIM-enabled software, the system 100 of FIG. 1 also includes a divergence detection device 150. The divergence detection device 150 extracts an PIM module identifier from the target address bits of an associated PIM operation. As will be explained below, the extracted PIM module identifiers of a set of PIM operations are compared to detect a divergence in the set of PIM operations, where a particular PIM operation targets a PIM module that is different from other PIM modules targeted in the set of PIM operations. That is, the divergence detection device 150 include logic circuitry configured to compare a second offload operation to a first offload operation that precedes the second offload operation and determine whether the second offload operation creates an execution hazard on an offload target device based on the comparison of the second offload operation to the first offload operation. In particular, the divergence detection device 150 include logic circuitry to compare a second offload target device identifier associated with the second offload operation to a first offload target device identifier associated with the first offload operation and detect the execution hazard when the first offload target device identifier and the second offload target device identifier disagree.

In some embodiments, the divergence detection device 150 identifies when to perform comparisons. In one example, the divergence detection device 150 identifies programmatic declarations of a sequence of offload operations (e.g., PIM operation) for which the comparison should be made. In another example, one or more bits in an offload instruction (e.g., a PIM instruction) processed by a processor core 102, 104 is used to indicate that subsequent PIM instructions must map to the same offload target device (e.g., the PIM module 110, 112). In yet another example, one or more bits in an offload instruction is used to indicate that the instruction must map to the same offload target device as a previous offload instruction. In yet another example, a separate dedicated offload instruction (e.g., a PIM instruction) is used to indicate that subsequent/previous offload instructions must map to the same offload target device (e.g., the PIM module 110, 112). In yet another example, access to a reserved target address identified in the offload instruction (e.g., a PIM instruction) is used to indicate that subsequent/previous offload instructions must map to the same offload target device (e.g., the PIM module 110, 112). In some implementations, the hardware infers when to perform a comparison based on pattern detection without explicit direction from the software.

For further explanation, consider an example vector add kernel that is implemented by PIM instructions:
for i=0:N:
  PIM_Ld(a[i]→pimR1)
  PIM_Add(pimR1+=b[i])
  PIM_St(pimR1→c[i])

In the above example, an elements of array a[ ] are read from memory into a PIM register pimR1 in the PIM register file (e.g., PIM register file 118) (i.e., PIM_Ld(a[i]→pimR1)). The contents of pimR1 are then added to an element of array b[ ] in memory and the result is stored in pimR1 (i.e., PIM_Add(pimR1+=b[i])). The contents of pimR1 are then stored in an element of array c[ ] (i.e., PIM_St (pimR1→c[i])). However, if arrays a[ ], b[ ], and c[ ], have not been properly aligned (or if the address offsets have not be calculated correctly), a[i], b[i], and c[i] could all map to different PIM modules, such that a garbage value is written to c[ ], leading to undefined, possibly non-deterministic behavior when c[ ] is read later.

In some embodiments, semantics in the instruction set architecture (ISA) are provided to indicate that a sequence of dependent PIM instructions are mapped to the same PIM module. For example, special instructions are provided to indicate the beginning and end of a sequence of PIM instructions that should be mapped to the same PIM module (i.e., the offload requests/commands generated from the PIM instructions should target the same PIM module). Sequence start and sequence end instructions may be standalone instructions or modifications of conventional PIM instructions. To illustrate this feature, consider an example of the above kernel of code modified with sequence start/end semantics (shown in bold) in accordance with embodiments of the present disclosure:

for i=0:N:
PIM_Ld_begin_seq(a [i]→pimR1)
PIM_Add(pimR1+=b[i])
PIM_St(pimR1→c[i])
PIM_end_seq( )

Note that the PIM_Ld_begin_seq is a sequence start instruction that includes a modification of the PIM_Ld instruction. In this case, the PIM_Ld_begin_seq indicates that this instruction and those that follow are part of the same sequence of PIM instructions that should map to the same PIM module. The PIM_end_seq( ) instruction is an end sequence instruction indicating that subsequent instructions are not required to map to the same PIM module associated with the sequence start instruction. In some examples, the sequence end instruction is not necessary and a sequence ends when a new sequence begins.

In some implementations, when a PIM sequence start instruction is identified in a thread executing on a processor core 102, 104, a flag is set to extract the target PIM module ID from the target address bits of the associated PIM operation. In these implementations, the flag travels through the load/store pipeline until the virtual to physical address translation occurs for the PIM instruction. In some examples, the target PIM module ID is then calculated based on architectural address mapping information. In other examples, the target PIM module ID is determined from page offset bits, and therefore can be calculated without a virtual to physical translation. If only some of the bits used to identify the target PIM module ID are included in the page offset bits, then it may be preferable to only compare these bits to avoid performing a virtual-physical translation (at the cost of some accuracy). In the divergence detection device 150, the target PIM module ID associated with the sequence start instruction is extracted and stored as active PIM module ID in a thread-local register (replacing the previous contents). The target PIM module ID of subsequent instructions are then compared to the active PIM module ID. For example, when subsequent PIM instructions are decoded, they set a flag that indicates a PIM index check is necessary. The target PIM module ID is calculated similarly for these operations and compared against the value of the active PIM module ID associated with the current thread. If there is a mismatch, this indicates a possible execution hazard on the PIM module when the PIM operations are executed. When such an execution hazard is detected, an error handling operation may be initiated. For example, the divergence detection device 150 may generate an interrupt or page fault, log warning information for debugging, force a failure, or other similar error handling operations.

In some examples, a single thread may interleave multiple instructions for offloading PIM operations to multiple PIM modules 110, 112. This interleaving can improve memory parallelism and help hide the latency of PIM operations. To allow compilers to implement this optimization while still detecting PIM mapping errors and divergent PIM operations in a sequence, an additional detection mechanism is provided. In such example, additional semantic/syntactic expressions may be included in the PIM code to indicate that a PIM instruction is part of a particular sequence. For example, each PIM instruction may include sequence label. This support can be implemented by allowing each PIM instruction to specify bits indicating a sequence label that is used to associate operations that target the same PIM module. To illustrate this feature, consider an example of PIM code modified with sequence start/end semantics and sequence label semantics (shown in bold) in accordance with embodiments of the present disclosure:

for i=0; i<N; i+=3:
PIM_Ld_begin_seq(a[i]→pimR1, seq0)
PIM_Ld_begin_seq(a[i+N]→pimR1, seq1)
PIM_Add(pimR1+=b[i], seq0)
PIM_Add(pimR1+=b[i+N], seq1)
PIM_St(pimR1→c[i], seq0)
PIM_St(pimR1→c[i+N], seq1)
PIM_end_seq(seq0)
PIM_end_seq(seq1)

In the above example, the instructions may be executed in a processor core 102 where instructions labeled with seq0 a required to map to the same PIM module (which may be determined to be, e.g., PIM module 110 after the PIM module ID is extracted) and instructions labeled with seq1 are required to map to the same PIM module (which may be determined to be, e.g., PIM module 112 after the PIM module ID is extracted).

In these examples, the sequence begin instruction associated with the PIM load instruction indicates the start of a PIM sequence which causes the calculated PIM module ID to be stored to a table as an active PIM module. This table stores multiple indices per thread—one per each active sequence label—and the sequence label associated with the sequence begin operation is used to index into the table. Subsequent PIM instructions have their target PIM module ID calculated and compared with the entry in the table that matches the sequence label associated with the instruction. If there is a mismatch in the PIM module IDs, an error handling action is taken as discussed above.

Figure 2:
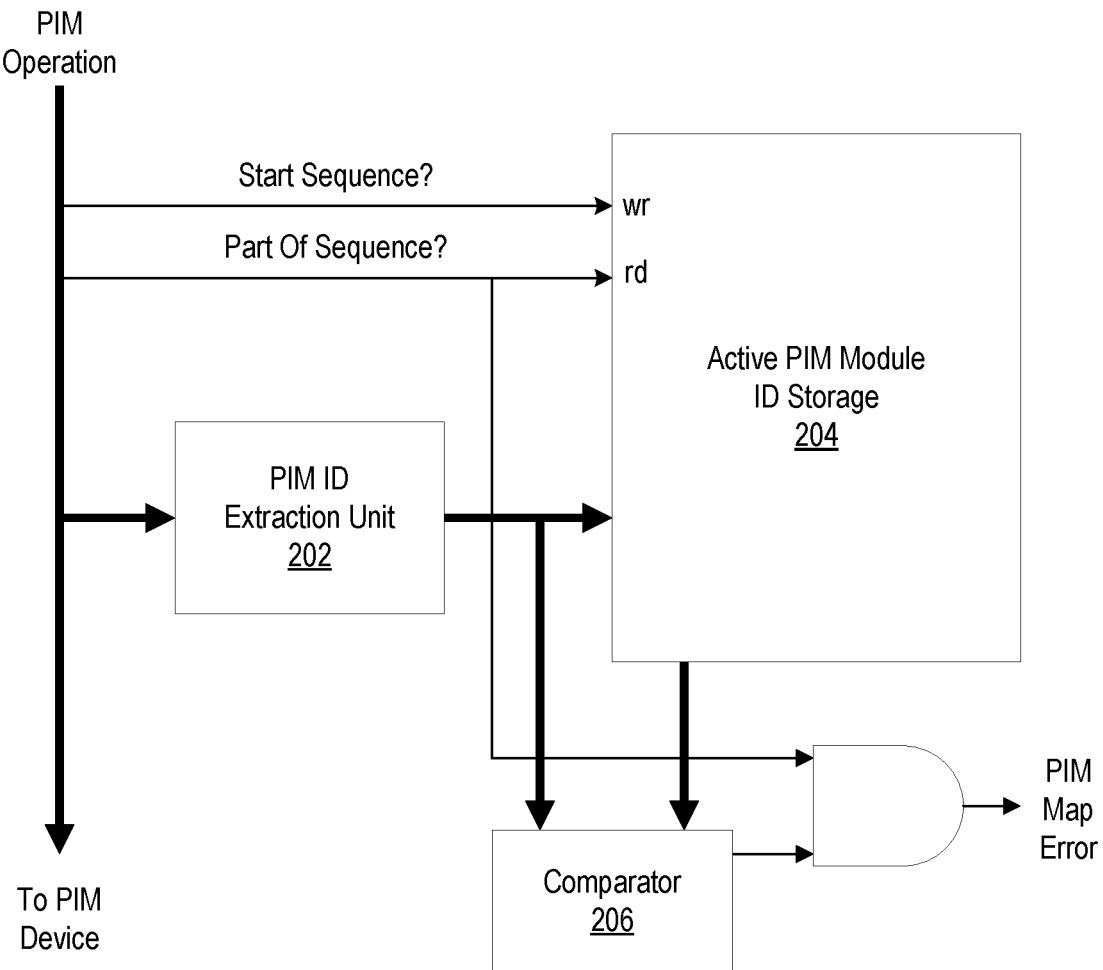
FIG. 2 sets forth a block diagram of another example system for detecting execution hazards in offloaded operations according to embodiments of the present disclosure.

For further explanation, FIG. 2 is a diagram illustrating an example implementation of the divergence detection device 150. After a PIM instruction is decoded, the divergence detection device 150 extracts PIM instruction information is from the PIM request issued by the processor core 102, 104. A PIM ID extraction unit 202 extracts the PIM module ID from a resolved target memory address (or page offset) associated with the PIM instruction. If a sequence start flag has been set, a write signal is asserted and the extracted PIM module ID is written to active PIM module ID storage 204. If the PIM instruction has an associated sequence label, a new table entry is created for the sequence label and the extracted PIM module ID is written to the entry. The sequence label is then used to index the table to identify the active PIM module ID associated with a particular sequence. A PIM module ID for each subsequent instruction that is not a sequence start or sequence end is also extracted by the PIM ID extraction unit 202 and a read signal is asserted on the active PIM module ID storage 204. The stored active PIM module ID is read into a comparator 206 where it is compared to the extracted PIM module ID. If the PIM instruction includes a sequence label, the sequence label is used to index the table in the active PIM module ID storage 204 to identify the corresponding active PIM module ID for that sequence label. If the stored active PIM module ID in active PIM module ID storage 204 and the extracted PIM module ID disagree, a PIM mapping error may have a occurred that could create an execution hazard.

In some embodiments, existing software synchronization semantics may be leveraged instead of or in addition to modifying the ISA of the processor cores with sequencing semantics. For example, a PIM architecture may already utilize a memory fence or other synchronization semantic to enforce the separation of PIM commands to the same PIM module from the same thread to prevent their reordering in the memory system. In this case, information about PIM commands that are intended to map to the same module (in that they are separated by the fence) may be used for divergent PIM command detection. Because the PIM fence will only be used between accesses to the same PIM module, the divergence detection device 150 described above can be modified to detect when the PIM module accessed by the last PIM operation before the fence does not match the PIM module accessed by the first PIM operation after the fence, based on the extracted PIM module IDs of each PIM operation. In some examples, the most recent PIM operation prior to a fence is latched (for example, by treating every PIM operation a sequence start operation), and by comparing the first PIM operation following each fence against this latched value; for example, this may be achieved by setting a bit on a fence instruction to trigger a sequence check for the next PIM operation.

In some embodiments, divergent PIM operations may be inferred instead of or in addition to modifying the ISA of the processor cores. In some examples, an error log entry is created for PIM operations that target a different PIM module than one or more preceding PIM operations. In some cases, the divergence detection device 150 infers whether a request should be to the same PIM module and only log requests that violate that expectation to reduce the logged information. For example, the divergence detection device 150 may identify that a threshold number of successive PIM operations or a common pattern of PIM operation types have targeted the same PIM module (by comparing each the PIM module ID of each new PIM operation to the PIM module ID of the preceding PIM operation) and record the next PIM operation that does not target the same PIM module ID as a potential divergent PIM operation that may create an execution hazard. On an actual failure, this log could be inspected for instructions that were expected to have mapped to the same PIM module.

Returning to FIG. 1, in the example system 100, it is possible that two PIM operations from different threads (e.g., on different cores 102, 104) are intended to map to different PIM modules, but actually map to the same PIM module. As with the previous error case of PIM operation divergence, this error case of a PIM module race condition could be created when a mapping function changes for different architectures giving rise to errors when porting code. These errors are also difficult to discover and debug. To simplify the process of programming, testing, and debugging new PIM software, it is beneficial to identify such PIM module race conditions.

To facilitate the programming, testing, and debugging of PIM-enabled software, the system 100 of FIG. 1 also includes a race detection device 152. The race detection device 152 extracts a thread identifier (thread ID) from thread index bits or core index bits of an offloaded PIM operation. As will be explained below, the extracted thread ID of a set of PIM operations are compared to detect a race condition between two threads at a PIM module, where a particular thread ID targeting a PIM module that is different from other thread IDs in a set of PIM module accesses. Unlike PIM operation divergence, racy PIM operations issuing from multiple threads cannot be easily detected by a processor core 102, 104. Thus, in some embodiment, the race detection device 152 is implemented in the PIM module 110, 112. In other embodiments, the race detection device 152 may be implemented elsewhere in the shared memory system (e.g., in the memory controller 106). For example, the memory controller arbitrates between offloaded PIM operations for access to a given PIM module 110, 112.

That is, the race detection device 152 include logic circuitry configured to compare a second offload operation to a first offload operation that precedes the second offload operation includes and determine whether the second offload operation creates an execution hazard on an offload target device based on the comparison of the second offload operation to the first offload operation. In particular, the logic circuitry is configured to compare a second thread identifier associated with the second offload operation to a first thread identifier associated with the first offload operation and detecting the execution hazard in the offload target device when the first thread identifier and the second thread identifier disagree.

For further explanation, consider the below example of a multithreaded version of the vector add function described above:

Thread 0
for i=0:(N/2):
PIM_Ld(a[i]→pimR1)
PIM_Add(pimR1+=b[i])
PIM_St(pimR1→c[i])
Thread 1
for i=(N/2+1):N:
PIM_Ld(a[i]→pimR1)
PIM_Add(pimR1+=b[i])
PIM_St(pimR1→c[i])

In this example, Thread 0 and Thread 1 run in parallel with the assumption that the two threads access array partitions that map to different PIM modules. However, if the assumed mapping is incorrect (or in a more complex code the address calculation is faulty), the partition mappings may overlap such that both threads concurrently access PIM register pimR1 of the same PIM module, leading to corrupted data and invalid values in c[ ].

One way to determine whether two conflicting PIM accesses form a race condition error is by comparing the issuing threads or cores of the PIM access. In many cases, racy operations (i.e., two PIM operations from different host threads that access the same PIM module without any intervening synchronization) should not occur. However, in some cases, it may be desirable for multiple threads to access the same PIM module. As such, it is beneficial to allow the software to specify when racy PIM accesses should not be happening.

In some embodiments, race detection device 152 relies on programmer/compiler signals and indications to determine when a PIM access races are disallowed between two or more threads. In these embodiments, the issuing thread index bits, the issuing core index bits, or some subset of these bits (referred to herein as the thread ID) are sent along with each PIM request to the memory device 108. During a race-free interval, a particular PIM module should only provide PIM access for offloading PIM operations to one thread or processor core. In some examples, a global race-free begin signal (and optionally a race-free end signal) may be used to enable or disable race detection at all, or subsets of, the PIM modules 110, 112. In these examples, these signals are implemented via an access to a memory mapped address. In some examples, race detection is enabled or disabled at each PIM module 110, 112 individually via a special memory access. In some examples, race detection is enabled or disabled at each PIM module 110, 112 individually via a PIM operation to the target PIM module (similar to "sequence begin" and "sequence end" operations discussed above). When race detection is first enabled, the thread ID is extracted from a PIM operation associated with the enable signal, such as the first PIM operation after the enable signal or a PIM operation that enables race detection. The thread ID is stored as an active thread index in a register local to the PIM module. Subsequent PIM operations (that do not represent an enable or disable signal themselves) are inspected to compare their thread ID against the currently active thread index. If there is a mismatch, then an illegal PIM race condition is detected. In response to detecting the illegal race condition, an error handling operation is performed. The error handling operation may include sending a Nack message back to the requesting processor core, raising a wire that triggers a fault, or writing error information to a log that may be queried by the host. To enable different threads to access a PIM module at different points in time, a race-free end signal or a new race-free begin signal must be provided to the PIM module, which can be automatically inserted at synchronization points. To enable different threads to access different registers of a PIM module concurrently, a separate thread ID can be stored and looked up for each register accessed by a PIM operation.

In various implementations, comparing identifiers such as a PIM module ID or a thread ID may include comparing a subset of bits in the PIM module ID or a thread ID rather than the full identifiers. Doing so can reduce overhead costs at the expense of hazard detection accuracy (false negatives may be more likely). For the purpose of debugging rather than code functionality, high precision may not be necessary and this tradeoff may be desirable in many systems.

Figure 3:
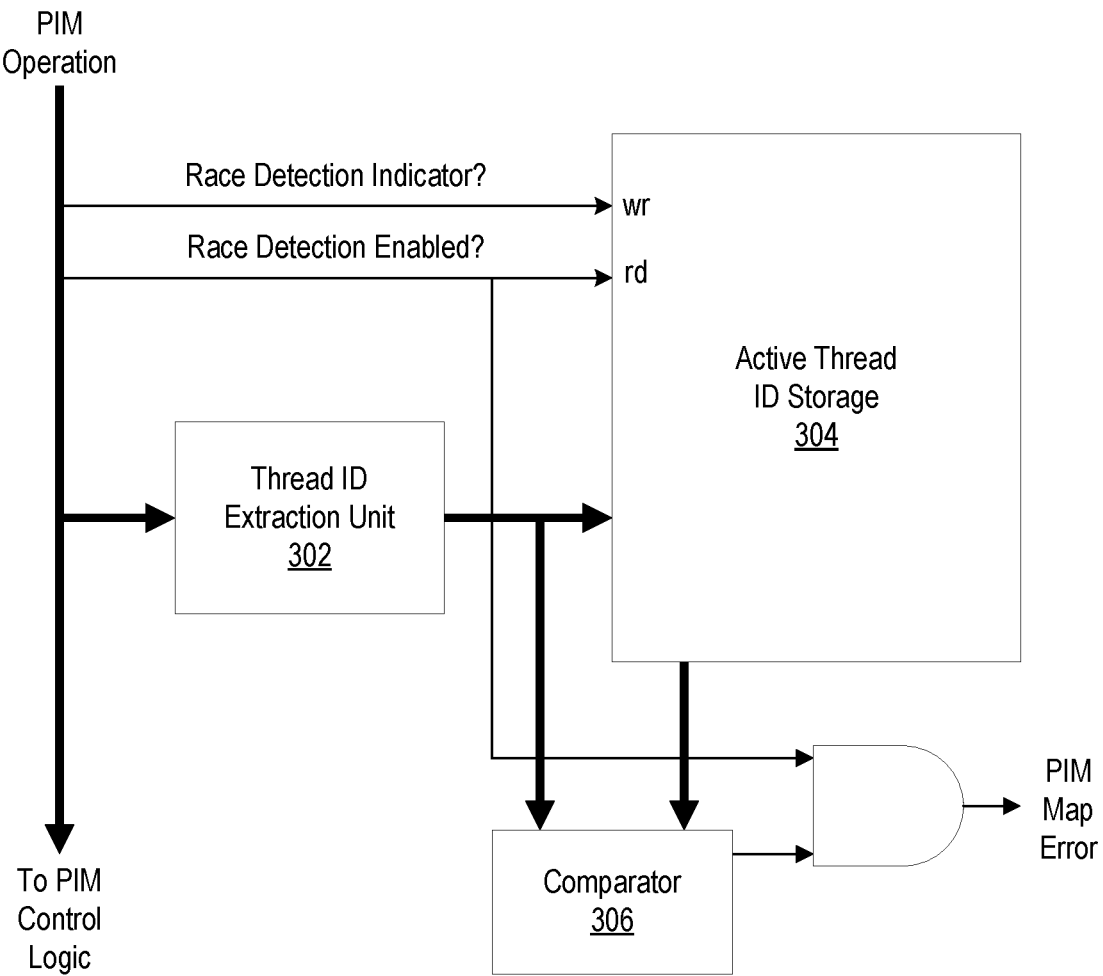
FIG. 3 sets forth a block diagram of another example system for detecting execution hazards in offloaded operations in accordance with embodiments of the present disclosure.

For further explanation, FIG. 3 is a diagram illustrating an example implementation of the race detection device 152. Upon detecting a race detection signal, a thread ID extraction unit 302 extracts the thread ID associated with the first PIM operation after the race detection signal or a PIM operation contemporaneous with the race detection signal. A write signal is asserted in an active thread ID storage 304 to record the extracted thread ID as an active thread index. The thread ID of each subsequent PIM operation that is not a race detection start or race detection end signal/indicator is also extracted by the PIM ID extraction unit 202 and a read signal is asserted on the active thread ID storage 304. The stored active thread index is read into a comparator 306 where it is compared to the extracted thread ID. If the stored active thread ID in the active thread ID storage 304 and the extracted thread ID disagree, a PIM mapping error may have a occurred that could create an execution hazard.

In some embodiments, a race detection signal or indicator indicates that an active thread ID should be stored for each PIM register in a PIM module, such that racy accesses to the same PIM module are allowed, but not to the same PIM register. In these embodiments, the active thread index is tracked per-register rather than per-module. For each PIM operation that targets a PIM register, the thread ID associated with the PIM operation is compared to the active thread index for that PIM register that was latched in response to a race detection signal. In such examples, the active thread ID storage 304 stores an active thread index for multiple registers in the register file 118 in the PIM module 110, 112.

In some embodiments, the race detection device 152 tracks an active thread for multiple PIM modules 110, 112. For example, the race detection device 152 may be implemented in the memory device 108 or memory controller 106 such that the race detection device 152 monitors PIM accesses to multiple PIM modules 110, 112. In these embodiments, the active thread ID storage 304 includes a table where each entry includes a PIM module ID and the active thread index for that PIM module.

In some embodiments, when race detection is enabled, racy writes are disallowed but racy reads are allowed. In this case, only PIM operations that write to a PIM register are compared against the active thread index. Accordingly, the race detection device 152 will remain agnostic to races between a single active writer and racy concurrent readers.

Figure 4:
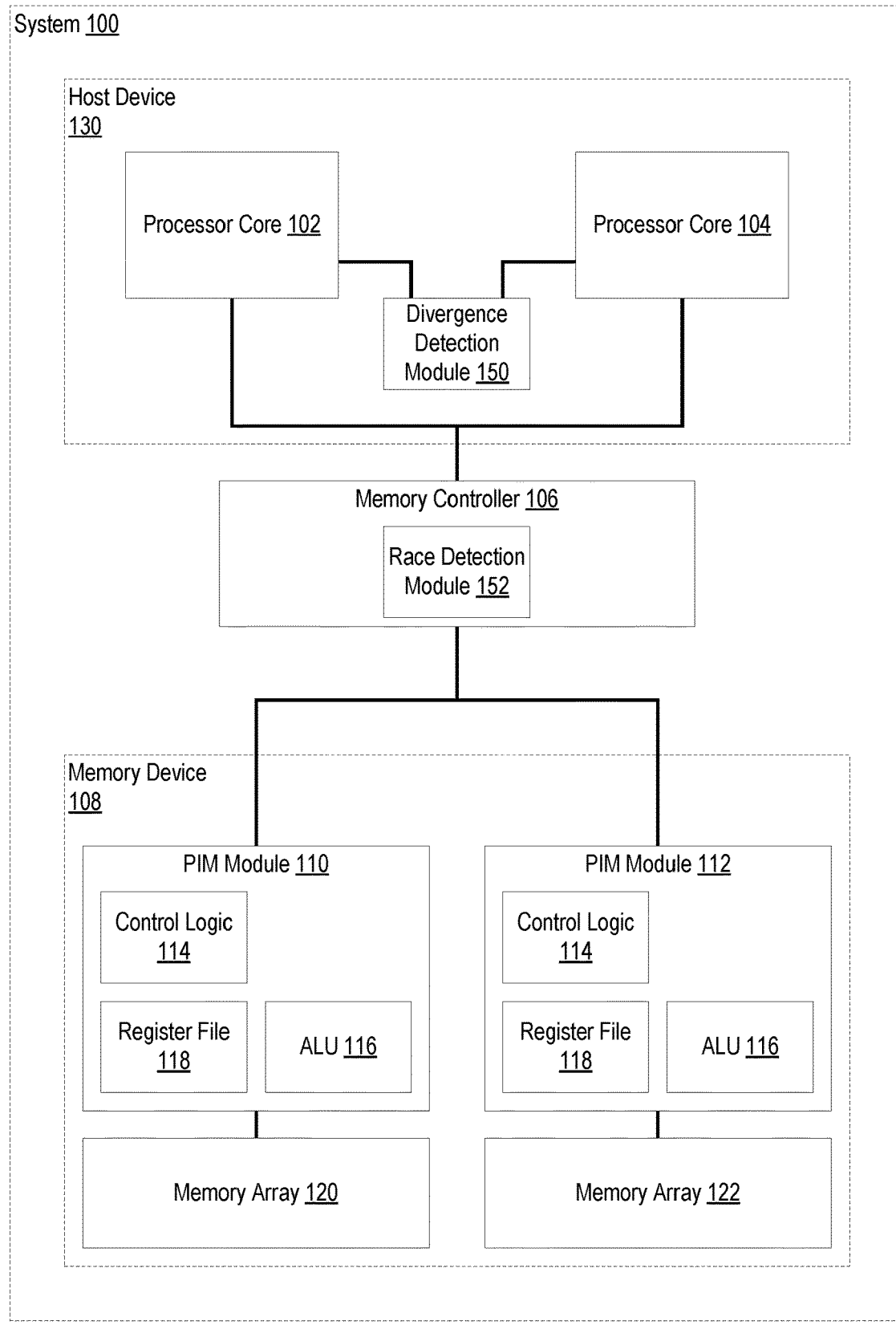
FIG. 4 sets forth a flow chart illustrating another example system for detecting execution hazards in offloaded operations in accordance with embodiments of the present disclosure.

For further explanation, FIG. 4 sets forth a block diagram of an example system 200 for detecting execution hazards in offloaded operations in accordance with the present disclosure. The example system 200 illustrates alternative configurations of the system 100 in FIG. 1. In the example system 200, an alternative configuration of the divergence detection device 150 is shown in which the divergence detection device 150 is shared by two or more cores 102, 104. In such a configuration, the divergence detection device 150 tracks the active PIM module ID for more than one thread. Accordingly, the divergence detection device 150 identifies a thread ID (e.g., a core index or a thread index) associated with the first PIM operation in a sequence and stores the thread identifier with the active PIM module ID. The thread identifier of a subsequent instruction in the sequence is also identified and used to index the corresponding active PIM module ID for comparison. Where a sequence label is used, the thread identifier is used to index the sequence label and corresponding active PIM module ID.

In the example system 200, an alternative configuration of the race detection device 152 is shown in which the race detection device 152 is implemented in the memory controller 106. In such a configuration, the race detection device 152 must track the active thread ID for more than one PIM module. Accordingly, the divergence detection device 150 identifies a PIM module ID targeted by the PIM operation and uses the PIM module ID to index the active thread ID for that PIM module.

Figure 5:
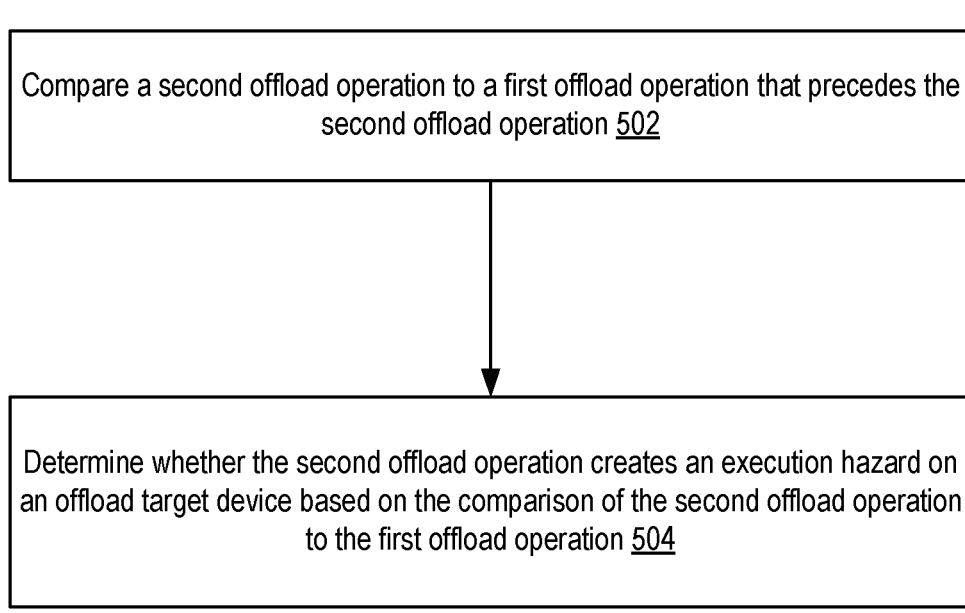
FIG. 5 sets forth a flow chart illustrating another example method of detecting execution hazards in offloaded operations in accordance with embodiments of the present disclosure.

For further explanation, FIG. 5 sets forth a flow chart illustrating an example method of detecting execution hazards in offloaded operations in accordance with the present disclosure. The example of FIG. 4 includes comparing 502 a second offload operation to a first offload operation that precedes the second offload operation. In some examples, comparing 502 a second offload operation to a first offload operation that precedes the second offload operation includes comparing characteristics of the offload operations, such as an offload target device identifier, an issuing thread index, an issuing core index, operands including target memory addresses or registers, and/or compiler notations or declarations (e.g., instruction labels or flags). In one example, the offload operation is a PIM operation for execution on a PIM device, where an offload request for the offload operation is generated from an offload instruction executed on a processor core, and where a PIM module is implemented within or near memory external to the processor core.

The method of FIG. 5 also includes determining 504 whether the second offload operation creates an execution hazard on an offload target device based on the comparison of the second offload operation to the first offload operation. In some examples, determining 504 whether the second offload operation creates an execution hazard on an offload target device based on the comparison of the second offload operation to the first offload operation includes identifying, from comparison of the characteristics of the offload operations, a divergence in the offload device targeted by the offload instructions. For example, a sequence of offload instructions in a processor core targeting a particular offload device may represent an explicit or implicit pattern, such that an offload instruction that targets a different offload device may indicate a divergence from the pattern that indicates a mapping error or that could otherwise lead to an execution hazard in the intended offload device or the unintended offload device. In another example, offload instructions received at an offload device from different threads/cores may indicate a race condition that indicates a mapping error or that could otherwise lead to an execution hazard on the offload device. Such mapping errors or execution hazards may be detected from the comparison of the characteristics of an instant offload operation to one or more prior offload operations, where the characteristics may include an offload target device identifier, an issuing thread index, an issuing core index, operands including target memory addresses or registers, and/or compiler notations or declarations (e.g., instruction labels or flags). Continuing the above example, the offload device may be the PIM module implemented within or near memory external to the processor core, as discussed above. In some examples, determining 504 whether the second offload operation creates an execution hazard on an offload target device based on the comparison of the second offload operation to the first offload operation is performed at runtime prior to offloading the offload operation to the offload target device. In this case, a PIM operation is not provided to the PIM module if the execution hazard is detected.

In some implementations, software may explicitly communicate which operations are dependent and require a hazard check (e.g., a compiler pass can infer operations that have dependencies, or that should be independent). Alternatively, hardware may infer when to perform a hazard check based on observed patterns. For example, if a thread repeatedly issues the same three operations, and all operations within each set of three map to the same offload target device, then hazard detection may be triggered if one of the offload operations in a subsequent set of three maps to a different offload target device than the other two in the set. This may not precisely identify hazards since the programmer's intention is not explicitly specified (e.g., it is possible the offending operation is intended to map to a different target device), but logging a warning at these times helps with programmability and debugging.

Figure 6:
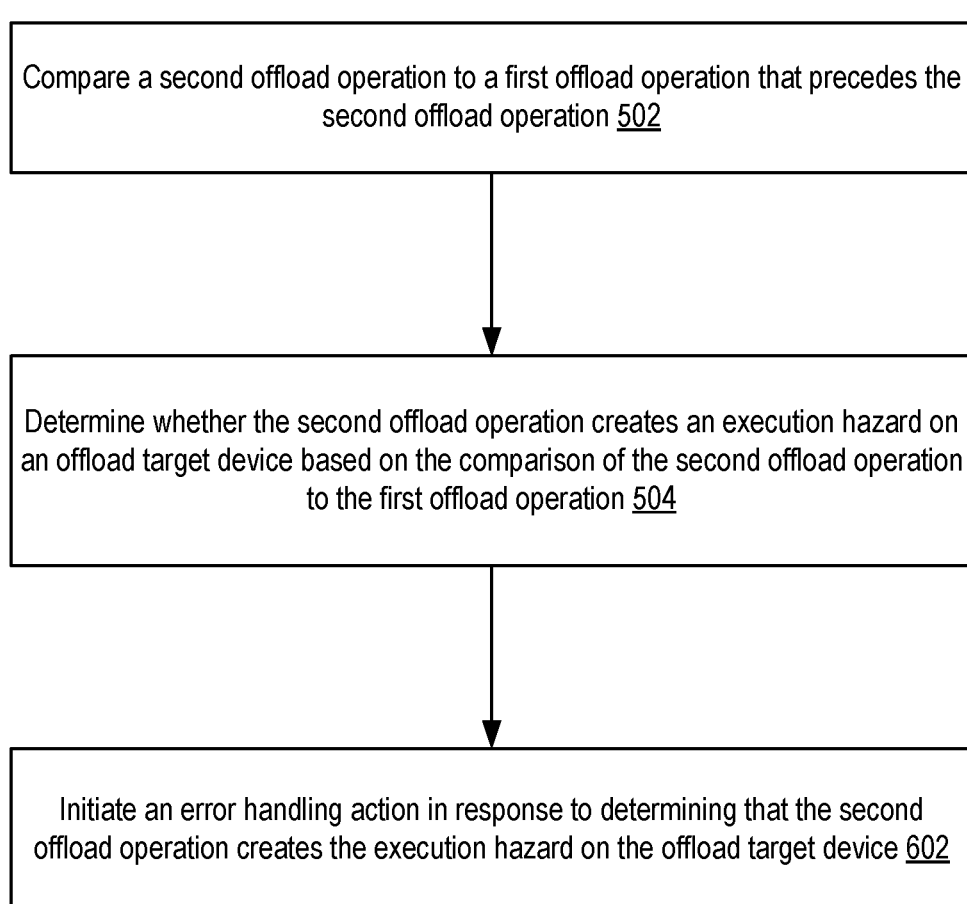
FIG. 6 sets forth a flow chart illustrating another example method of detecting execution hazards in offloaded operations in accordance with embodiments of the present disclosure.

For further explanation, FIG. 6 sets forth a flow chart illustrating another example method of detecting execution hazards in offloaded operations in accordance with the present disclosure. Like the method of FIG. 5, the method of FIG. 6 includes comparing 502 a second offload operation to a first offload operation that precedes the second offload operation and determining 504 whether the second offload operation creates an execution hazard on an offload target device based on the comparison of the second offload operation to the first offload operation. The method of FIG. 6 also includes initiating 602 an error handling action in response to determining that the second offload operation creates the execution hazard on the offload target device. In some examples, initiating 602 an error handling action in response to determining that the second offload operation creates the execution hazard on the offload target device is carried out by sending an error message or nack, triggering a fault, forcing a failure, or creating an entry in an error log.

Figure 7:
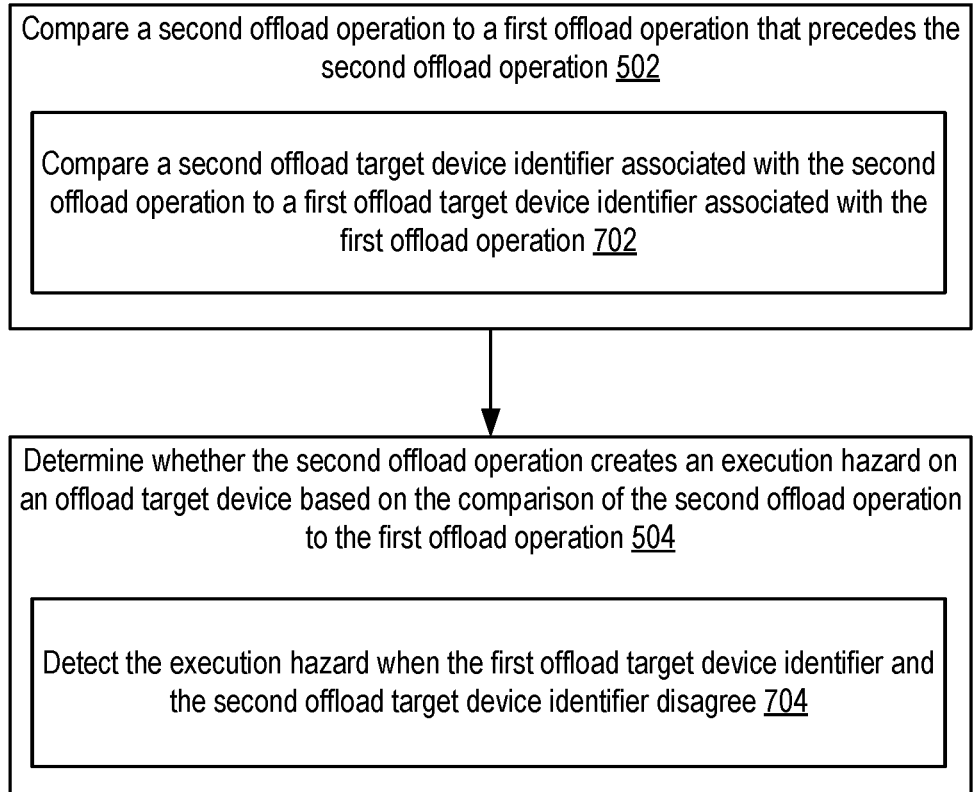
FIG. 7 sets forth a flow chart illustrating another example method of detecting execution hazards in offloaded operations in accordance with embodiments of the present disclosure.

For further explanation, FIG. 7 sets forth a flow chart illustrating another example method of detecting execution hazards in offloaded operations in accordance with the present disclosure. Like the method of FIG. 5, the method of FIG. 7 includes comparing 502 a second offload operation to a first offload operation that precedes the second offload operation and determining 504 whether the second offload operation creates an execution hazard on an offload target device based on the comparison of the second offload operation to the first offload operation.

In the method of FIG. 7, comparing 502 a second offload operation to a first offload operation that precedes the second offload operation includes comparing 702 a second offload target device identifier associated with the second offload operation to a first offload target device identifier associated with the first offload operation. In some examples, comparing 702 a second offload target device identifier associated with the second offload operation to a first offload target device identifier associated with the first offload operation is carried out by extracting the second offload target device identifier from data describing the second offload operation and extracting the first offload target device identifier from data describing the first offload operation. In some examples, the first offload operation may be a reference operation in that the second offload operation is expected to map to the same offload target device as the first offload operation. In some implementations, the first and second offload operations are PIM operations that target a PIM module. In these implementations, a PIM module ID is extracted from a subset of bits in a resolved target memory address or from a page offset using an architectural mapping table.

In the method of FIG. 7, determining 504 whether the second offload operation creates an execution hazard on an offload target device based on the comparison of the second offload operation to the first offload operation includes detecting 704 the execution hazard in the offload target device when the first offload target device identifier and the second offload target device identifier disagree. In some examples, detecting 704 the execution hazard when the first offload target device identifier and the second offload target device identifier disagree is carried out by determining, from the identification that the first offload target device identifier and the second offload target device identifier do not match, that an offload target device mapping error has occurred. Where it is assumed that the second offload operation and the first offload operation should map to the same offload target device, the detected offload target device mapping error presents an execution hazard on the intended offload target device, the unintended offload target device, or both. In some implementations, the first offload target device identifier is a reference identifier in that the second offload operation is expected to map to this identifier.

In some implementations, comparing 702 a second offload target device identifier associated with the second offload operation to a first offload target device identifier associated with the first offload operation and detecting 704 the execution hazard when the first offload target device identifier and the second offload target device identifier disagree are carried out by the divergence detection device 150 described with reference to FIG. 1 in that the divergence detection device 150 is implemented in a processor core 102 and/or a processor core 104. In some examples, as depicted in FIG. 4, the divergence detection device 150 may be shared by multiple processor cores 102, 104. In these examples, the divergence detection device 150 differentiates between offload operations issued by the multiple cores and offload devices targeted by those operations. In such examples, comparing 502 a second offload operation to a first offload operation that precedes the second offload operation further includes identifying a second thread identifier associated with the second offload operation and first thread identifier associated with the first offload operation.

Figure 8:
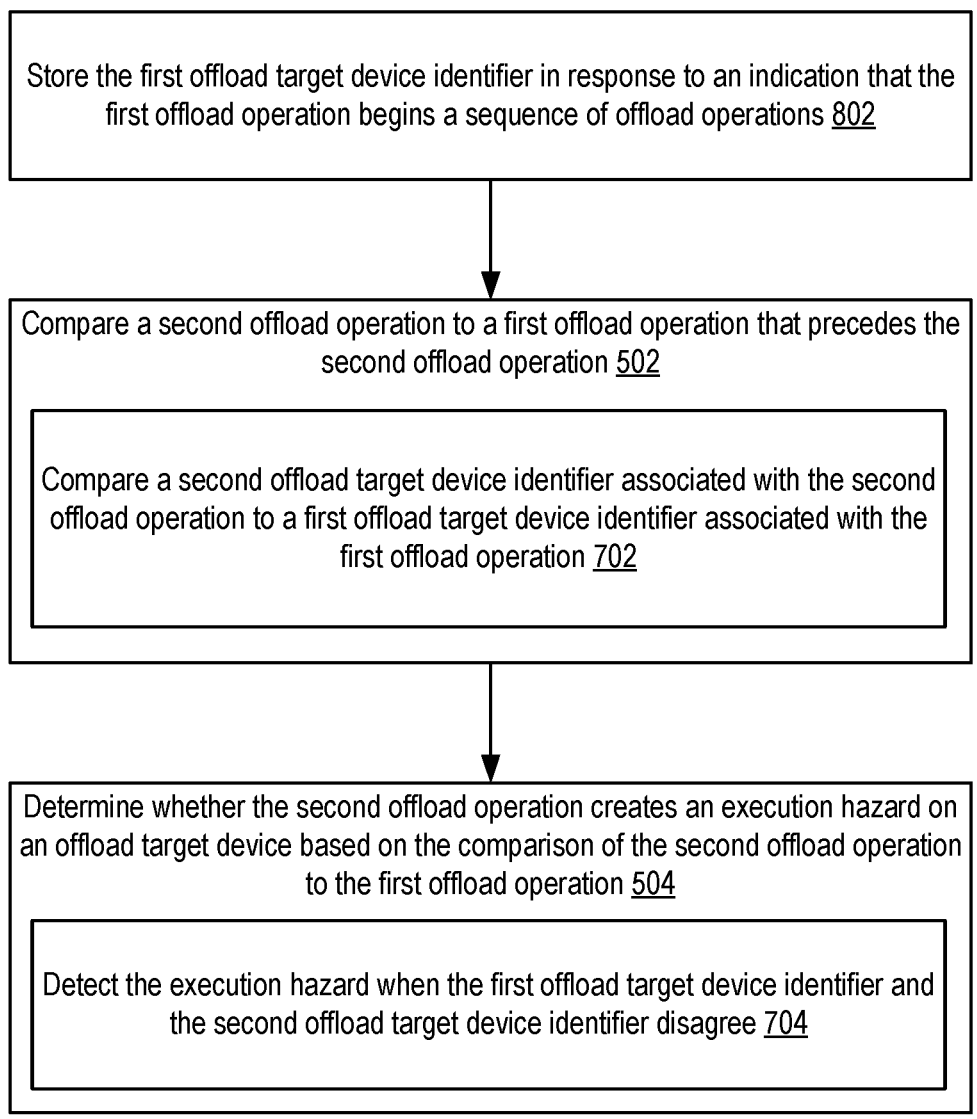
FIG. 8 sets forth a flow chart illustrating another example method of detecting execution hazards in offloaded operations in accordance with embodiments of the present disclosure.

For further explanation, FIG. 8 sets forth a flow chart illustrating another example method of detecting execution hazards in offloaded operations in accordance with the present disclosure. Like the method of FIG. 7, the method of FIG. 8 includes comparing 502 a second offload operation to a first offload operation that precedes the second offload operation including comparing 702 a first offload target device identifier associated with the second offload operation to a second offload target device identifier associated with the first offload operation and determining 504 whether the second offload operation creates an execution hazard on an offload target device based on the comparison of the second offload operation to the first offload operation including detecting 704 the execution hazard when the first offload target device identifier and the second offload target device identifier disagree.

The method of FIG. 8 also includes storing 802 the first offload target device identifier in response to an indication that the first offload operation begins a sequence of offload operations. In some implementations, storing 802 the first offload target device identifier in response to an indication that the first offload operation begins a sequence of offload operations is carried out by the divergence detection device 150 shown in FIG. 1, 2, or 4. In some examples, storing 802 the first offload target device identifier in response to an indication that the first offload operation begins a sequence of offload operations includes latching the first offload target device identifier associated with the initial offload operation in a sequence of offload operations. For example, the first offload target device identifier is latched in response to the first offload operation including a sequence start flag or immediately following a sequence start instruction. In these examples, first offload target device identifier is latched into storage such as the active PIM module ID storage 204 described with reference to FIG. 3. For example, the first offload target device identifier is extracted and latched in response to detecting the outset of a sequence of PIM operations. In this example, the offload target device identifier of each subsequent PIM operation, including the second offload target device identifier of the second offload operation, is then compared to the latched first offload target device identifier until the end of the sequence is encounter or a new sequence is detected. The sequence of PIM operations may be detected from special instructions, flag bits, programmatic indications, or accesses to a reserved target address as discussed above. For example, a sequence start and a sequence end instructions may be used to mark the boundary of a sequence of PIM operations that should map to the same PIM module. In response to detecting a sequence start instruction (e.g., the PIM operation associated with the sequence start instruction or that is identified by flag bits set for the PIM operation or by immediately following a sequence start instruction), the PIM module ID associated with the PIM operation is latched for future reference.

In some examples, each offload operation is treated as sequence start operation in that the offload target device identifier is latched from every offload operation. When used in conjunction with synchronization primitives such a fence, the offload target device identifier latched immediately after a fence may be compared to the offload target device identifier latched immediately before the fence. For example, a PIM operation immediately after a fence may be compared to a PIM operation immediately before the fence for the purpose of detecting execution hazards or identifying potential memory mapping errors.

Figure 9:
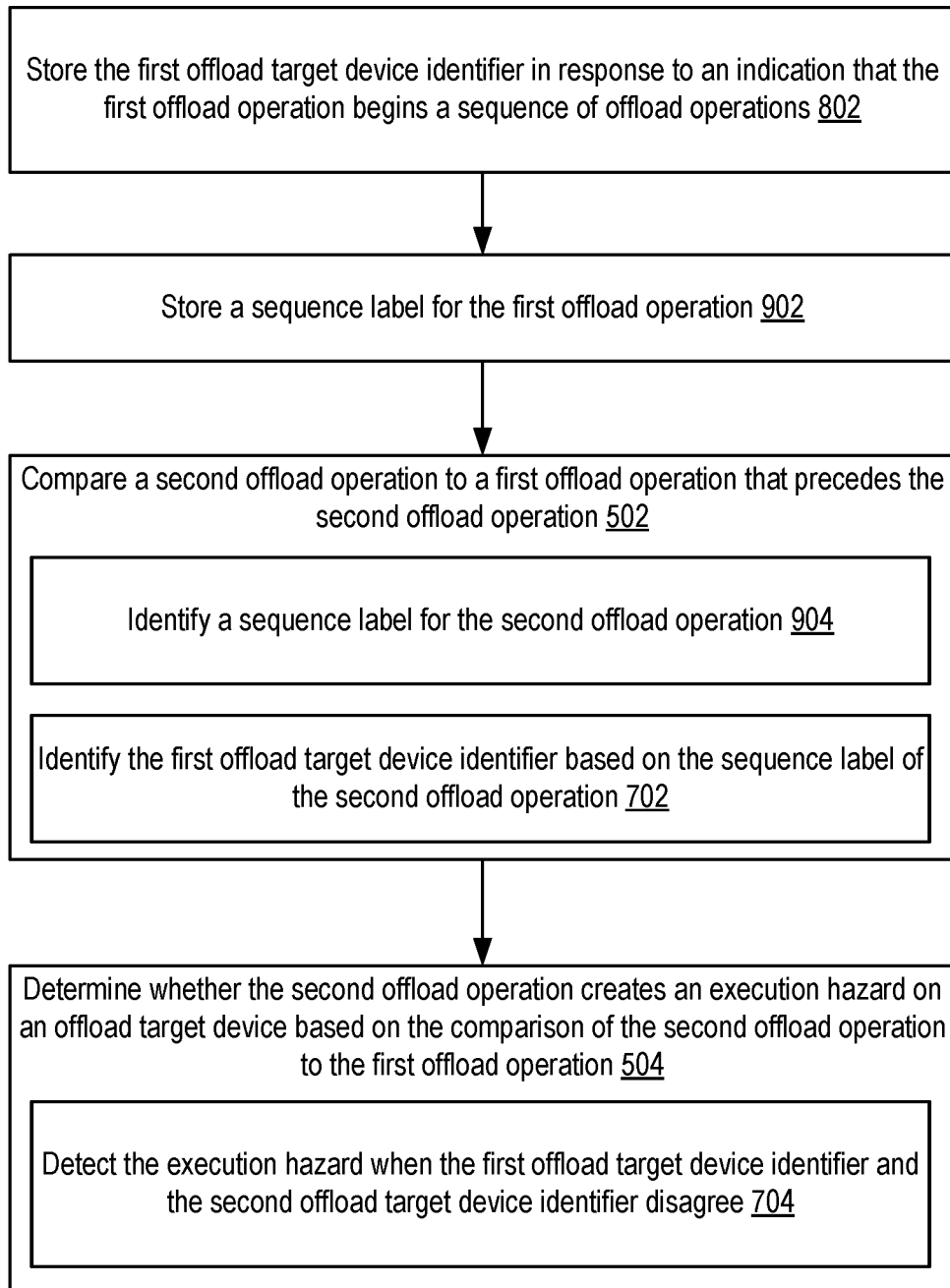
FIG. 9 sets forth a flow chart illustrating another example method of detecting execution hazards in offloaded operations in accordance with embodiments of the present disclosure.

For further explanation, FIG. 9 sets forth a flow chart illustrating another example method of detecting execution hazards in offloaded operations in accordance with the present disclosure. Like the method of FIG. 8, the method of FIG. 9 includes storing 802 the first offload target device identifier in response to an indication that the first offload operation begins a sequence of offload operations, comparing 502 a second offload operation to a first offload operation that precedes the second offload operation including comparing 702 a second offload target device identifier associated with the second offload operation to a first offload target device identifier associated with the first offload operation and determining 504 whether the second offload operation creates an execution hazard on an offload target device based on the comparison of the second offload operation to the first offload operation including detecting 704 the execution hazard when the first offload target device identifier and the second offload target device identifier disagree.

In the method of FIG. 9, storing 802 the first offload target device identifier in response to an indication that the first offload operation begins a sequence of offload operations includes storing 902 a sequence label for the first offload operation. In some implementations, storing 902 a sequence label for the first offload operation is carried out by the divergence detection device 150 shown in FIG. 1, 2, or 4. In some examples, storing 902 a sequence label for the first offload operation includes reading a sequence label from information from information associated with the first offload operation. For example, the first offload operation may be associated with a sequence start instruction that includes a sequence label. Storing 902 a sequence label for the first offload operation may also include setting a flag to indicate that sequence labels of subsequent operations should be identified from information associated with those operations. In some examples, the offload operation is a PIM operation and the offload target device is a PIM module. In these examples, the sequence label of the PIM operation associated with a sequence start instruction and the corresponding active PIM module ID are stored in a table in the active PIM module ID storage 204 of the divergence detection module as describe with reference to FIG. 2.

In the method of FIG. 9, comparing 502 a second offload operation to a first offload operation that precedes the second offload operation further includes identifying 904 a sequence label for the second offload operation. In some implementations, identifying 904 a sequence label of the second offload operation is carried out by the divergence detection device 150 shown in FIG. 1, 2, or 4. In some examples, identifying 904 a sequence label for the second offload operation includes reading a sequence label from information from information associated with the second offload operation. For example, the second offload operation may be an operation that follows the first offload operation associated with a sequence start instruction. In such an example, the sequence label of the second offload operation may be read in response to identifying that a flag has been set for checking sequence labels of offload operations.

In the method of FIG. 9, comparing 502 a second offload operation to a first offload operation that precedes the second offload operation further includes identifying 906 the first offload target device identifier based on the sequence label of the second offload operation. In some implementations, identifying 906 the first offload target device identifier based on the sequence label of the second offload operation is carried out by the divergence detection device 150 shown in FIG. 1, 2, or 4. In some examples, the sequence label of the second offload operation is used to index a table that includes an entry for corresponding active offload target device identifier. In some examples, the offload operations are PIM operations and the offload target device is a PIM module. In these examples, the sequence label of the PIM operation associated with the second offload operation is used to identify and offload target device identifier from a table of active PIM module IDs stored in the active PIM module ID storage 204 of the divergence detection module, as described with reference to FIG. 2.

Figure 10:
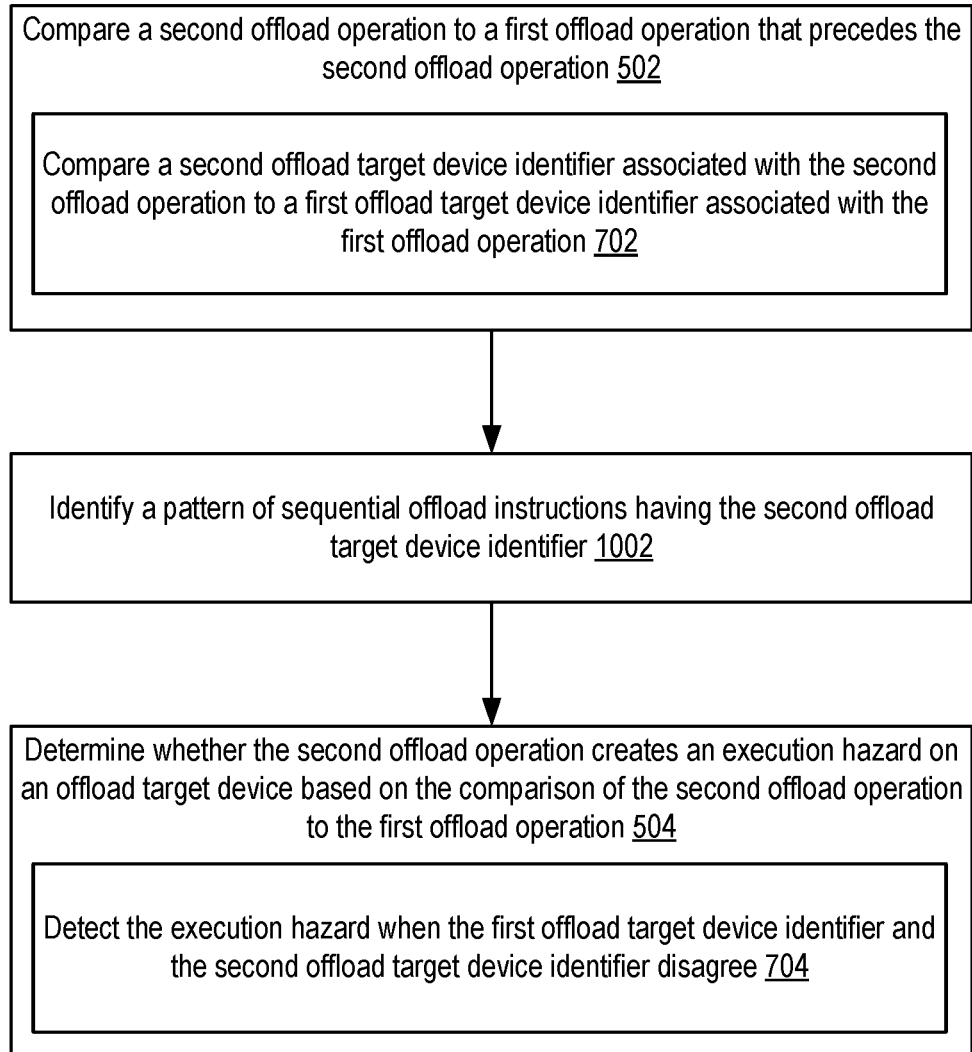
FIG. 10 sets forth a flow chart illustrating another example method of detecting execution hazards in offloaded operations in accordance with embodiments of the present disclosure.

For further explanation, FIG. 10 sets forth a flow chart illustrating another example method of detecting execution hazards in offloaded operations in accordance with the present disclosure. Like the method of FIG. 7, the method of FIG. 10 includes comparing 502 a second offload operation to a first offload operation that precedes the second offload operation including comparing 702 a second offload target device identifier associated with the second offload operation to a first offload target device identifier associated with the first offload operation and determining 504 whether the second offload operation creates an execution hazard on an offload target device based on the comparison of the second offload operation to the first offload operation including detecting 704 the execution hazard when the first offload target device identifier and the second offload target device identifier disagree.

The method of FIG. 10 also includes identifying 1002 a pattern of sequential offload instructions having the first offload target device identifier. In some implementations, a threshold number of successive accesses to the same offload target device are required before an access to a different offload target device is considered divergent such that an execution hazard may be present. In some examples, identifying 1002 a pattern of sequential offload instructions having the first offload target device identifier includes extracting an offload target device identifier for each offload operation encounter and comparing it to the offload target device identifier immediately preceding. For each instance that a subsequent offload target device identifier matches the first offload target device identifier, a counter is incremented. When the counter reaches a threshold number of instances of matching offload target device identifiers, a flag is set to indicate that the threshold has been met. While the flag is set, a disagreement between the first offload target device identifier and the second offload target device identifier may indicate that the second offload operation is a divergent offload operation that potentially maps to the incorrect offload target device. In this case, the potential execution hazard may be logged in an error log for use in debugging.

Figure 11:
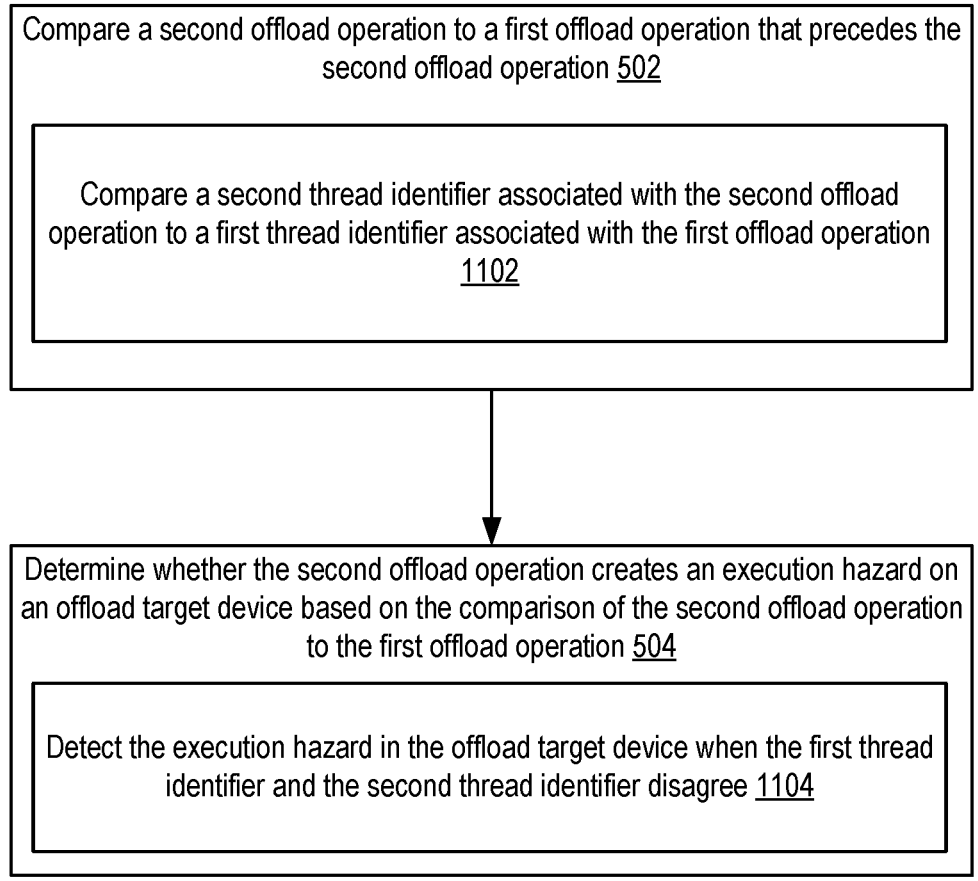
FIG. 11 sets forth a flow chart illustrating another example method of detecting execution hazards in offloaded operations in accordance with embodiments of the present disclosure.

For further explanation, FIG. 11 sets forth a flow chart illustrating another example method of detecting execution hazards in offloaded operations in accordance with the present disclosure. Like the method of FIG. 5, the method of FIG. 11 includes comparing 502 a second offload operation to a first offload operation that precedes the second offload operation and determining 504 whether the second offload operation creates an execution hazard on an offload target device based on the comparison of the second offload operation to the first offload operation.

In the method of FIG. 11, comparing 502 a second offload operation to a first offload operation that precedes the second offload operation includes comparing 1102 a second thread identifier associated with the second offload operation to a first thread identifier associated with the first offload operation. In some implementations, comparing a second thread identifier associated with the second offload operation to a first thread identifier associated with the first offload operation is carried out by the race detection device 152 described with reference to FIGS. 1, 3, and 4. In some examples, comparing 1102 a second thread identifier associated with the second offload operation to a first thread identifier associated with the first offload operation includes identifying a thread index or a core index associated with the second offload operation and the first offload operation and using the thread index or core index as a thread identifiers for the second offload operation and the first offload operation, respectively. In some examples, the thread index or a core index is included in information about the second offload operation and the first offload operation that is received from a processor core 102, 104. In some implementations, the second offload operation and the first offload operation are PIM operations that have been offloaded to a PIM module 110, 112.

In the method of FIG. 11, determining 504 whether the second offload operation creates an execution hazard on an offload target device based on the comparison of the second offload operation to the first offload operation includes detecting 1104 the execution hazard in the offload target device when the first thread identifier and the second thread identifier disagree. In some implementations, detecting 1104 the execution hazard in the offload target device when the first thread identifier and the second thread identifier disagree is carried out by the race detection device 152 described with reference to FIGS. 1, 3, and 4. In some examples, detecting 1104 the execution hazard in the offload target device when the first thread identifier and the second thread identifier disagree includes determining that two processor cores (e.g., processor cores 102, 104) have created a race condition for access to the offload target device (e.g., PIM module 110). In these examples, the race condition is detected based on the determination that the thread identifier of the second offload operation does not match the thread identifier of the first offload operation. For example, the second offload operation and the first offload operation may be PIM operations. When the execution hazard created by the race condition is detected, the offload target device may send a Nack or error message to the processor core(s) and/or or trigger a fault.

Figure 12:
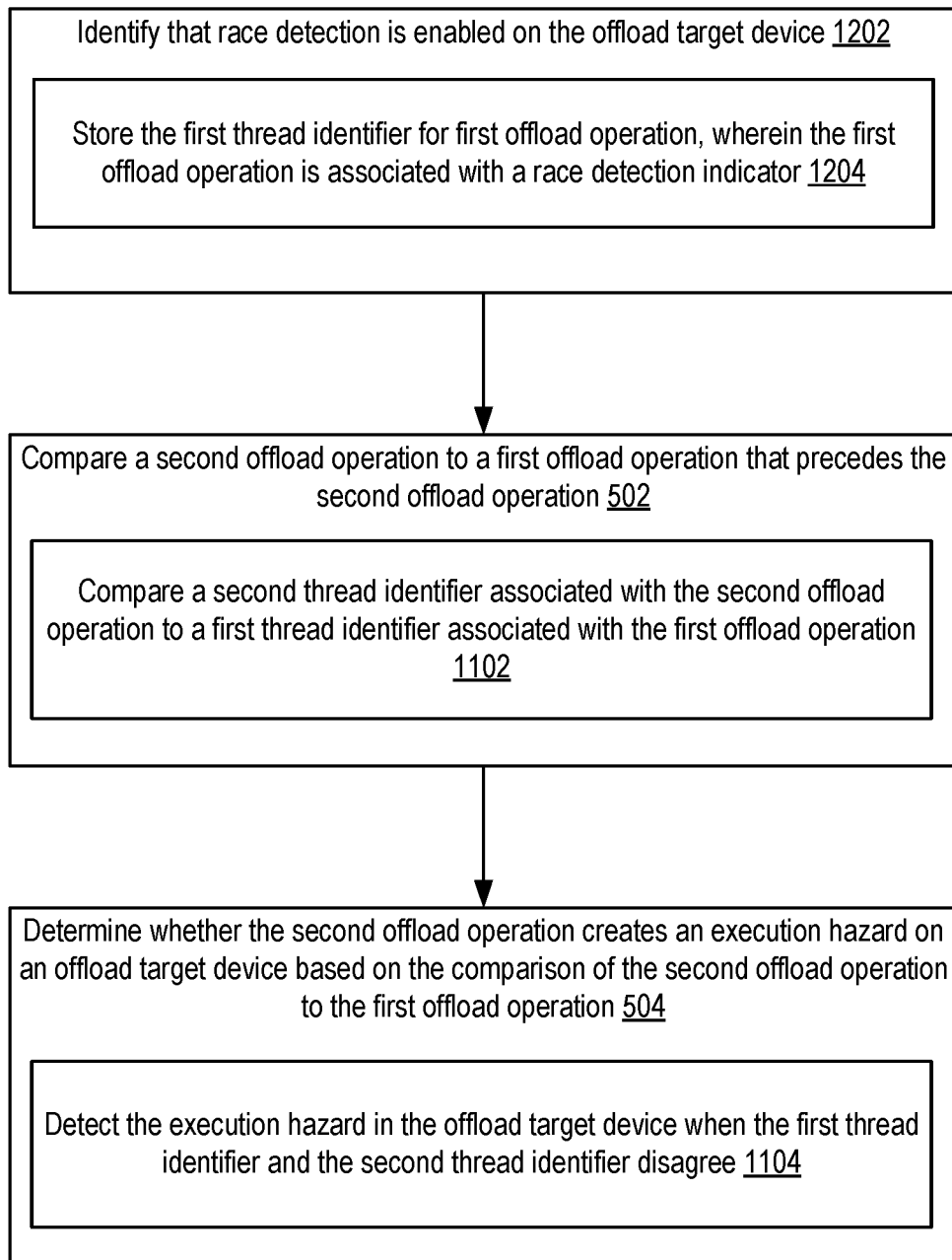
FIG. 12 sets forth a flow chart illustrating another example method of detecting execution hazards in offloaded operations in accordance with embodiments of the present disclosure.

For further explanation, FIG. 12 sets forth a flow chart illustrating another example method of detecting execution hazards in offloaded operations in accordance with the present disclosure. Like the method of FIG. 11, the method of FIG. 12 includes comparing 502 a second offload operation to a first offload operation that precedes the second offload operation including comparing 1102 a second thread identifier associated with the second offload operation to a first thread identifier associated with the first offload operation, and determining 504 whether the second offload operation creates an execution hazard on an offload target device based on the comparison of the second offload operation to the first offload operation including detecting 1104 the execution hazard in the offload target device when the first thread identifier and the second thread identifier disagree.

The method FIG. 12 also includes identifying 1202 that race detection is enabled on the offload target device. In some implementations, identifying 1202 that race detection is enabled on the offload target device is carried out by the race detection device 152 described with reference to FIGS. 1, 3, and 4. In some examples, identifying 1202 that race detection is enabled on the offload target device is carried out by detecting a race detection signal. A race detection signal may be used to enable or disable race detection on one or more offload target devices. In some examples, identifying 1202 that race detection is enabled on the offload target device is carried out by identifying an offload operation that enables or disables race detection on an offload target device. In some example, identifying 1202 that race detection is enabled on the offload target device is carried out by identifying an access to a reserved target memory address on an offload target device. While race detection is enabled, a race condition is disallowed on the offload target device in that only offload operations originating from the same thread identifier should be allowed to execute.

In some implementations, identifying 1202 that race detection is enabled on the offload target device includes storing 1204 the first thread identifier for first offload operation, wherein the first offload operation is associated with a race detection indicator. For example, the race detection indicator may be a race detection signal, a race detection enabling offload operation, or an access to a reserved target memory address as discussed above. In some examples, the first offload operation is associated with the race detection indicator in that the first offload operation is the initial offload operation after the race detection indicator enables race detection. In some examples, the offload operation itself may include the race detection indicator that enables race detection. Upon identifying that race detection, in some examples, the thread identifier associated with the first offload operation is latched. For example, the first offload operation may be a PIM operation and the offload target device may be a PIM module 110, 112. In this example, storing 1204 the first thread identifier for first offload operation, wherein the first offload operation is associated with a race detection indicator, may be carried out by storing the thread identifier associated with a processor core 102, 104 that issued the offload operation in the active thread ID storage 304 described above with reference to FIG. 3.

The flowchart and block diagrams in the figures illustrate the architecture, functionality, and operation of possible implementations of systems, methods, and logic circuitry according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

What is claimed is:

1. A method of detecting mapping errors associated with processing-in-memory instructions, the method comprising:

comparing a first identifier associated with a first processing-in-memory (PIM) instruction to a second identifier associated with a second PIM instruction;

detecting a PIM device mapping error based on the comparison of the first identifier to the second identifier; and initiating an error handling action in response to detecting the PIM device mapping error.

2. The method of claim 1, wherein initiating an error handling action includes at least one of sending an error message, creating an error log entry, and triggering a fault.

3. The method of claim 1, wherein comparing a first identifier associated with a first PIM instruction to a second identifier associated with a second PIM instruction includes comparing a first PIM device identifier associated with the first PIM instruction to a second PIM device identifier associated with the second PIM instruction; and wherein detecting a PIM device mapping error based on the comparison of the first identifier to the second identifier includes detecting the PIM device mapping error when the first PIM device identifier and the second PIM device identifier disagree.

4. The method of claim 3 further comprising storing the first PIM device identifier in response to an indication that the first PIM instruction begins a sequence of PIM instructions.

5. The method of claim 4 further comprising storing a sequence label for the first PIM instruction;

wherein comparing the first identifier to the second identifier further includes:

identifying a sequence label of the second PIM instruction; and identifying the first PIM device identifier based on the sequence label of the second PIM instruction.

6. The method of claim 3 further comprising identifying a pattern of sequential PIM instructions having the first PIM device identifier.

7. The method of claim 1, where comparing the first identifier to the second identifier includes comparing a first thread identifier associated with the first PIM instruction to a second thread identifier associated with the second PIM instruction; and wherein detecting a PIM device mapping error based on the comparison of the first identifier to the second identifier includes detecting the PIM device mapping error when the first thread identifier and the second thread identifier disagree.

8. The method of claim 7 further comprising identifying that race detection is enabled on an PIM device.

9. The method of claim 8 wherein identifying that race detection is enabled on the PIM device includes storing the first thread identifier for first PIM instruction, wherein the first PIM instruction is associated with a race detection indicator.

10. The method of claim 9, wherein the race detection indicator includes at least one of a race detection signal, a race detection enabling offload operation, or access to a reserved target memory address.

11. The method of claim 1, wherein comparing the first identifier associated with the first PIM instruction to the second identifier associated with a second PIM instruction and detecting the PIM device mapping error based on the comparison of the first identifier to the second identifier are carried out at runtime.

12. An apparatus for detecting mapping errors associated with processing-in-memory instructions, the apparatus comprising:

memory; and a divergence detection device configured to:
- compare a first identifier associated with a first processing-in-memory (PIM) instruction to a second identifier associated with a second PIM instruction;
- detect a PIM device mapping error based on the comparison of the first identifier to the second identifier; and
- initiate an error handling action in response to detecting the PIM device mapping error.

13. The apparatus of claim 12, wherein initiating an error handling action includes at least one of sending an error message, creating an error log entry, and triggering a fault.

14. The apparatus of claim 12, wherein comparing a first identifier associated with a first PIM instruction to a second identifier associated with a second PIM instruction includes comparing a first PIM device identifier associated with the first PIM instruction to a second PIM device identifier associated with the second PIM instruction; and
- wherein detecting a PIM device mapping error based on the comparison of the first identifier to the second identifier includes detecting the PIM device mapping error when the first PIM device identifier and the second PIM device identifier disagree.

15. The apparatus of claim 12, where comparing the first identifier to the second identifier includes comparing a first thread identifier associated with the first PIM instruction to a second thread identifier associated with the second PIM instruction; and
- wherein detecting a PIM device mapping error based on the comparison of the first identifier to the second identifier includes detecting the PIM device mapping error when the first thread identifier and the second thread identifier disagree.

16. A system for detecting mapping errors associated with processing-in-memory instructions, the system comprising:
- two or more processor cores;
- two or more processing-in-memory (PIM) devices; and
- a divergence detection device configured to:
  - compare a first identifier associated with a first processing-in-memory (PIM) instruction to a second identifier associated with a second PIM instruction;
  - detect a PIM device mapping error based on the comparison of the first identifier to the second identifier; and
  - initiate an error handling action in response to detecting the PIM device mapping error.

17. The system of claim 16, wherein initiating an error handling action includes at least one of sending an error message, creating an error log entry, and triggering a fault.

18. The system of claim 16, wherein comparing a first identifier associated with a first PIM instruction to a second identifier associated with a second PIM instruction includes comparing a first PIM device identifier associated with the first PIM instruction to a second PIM device identifier associated with the second PIM instruction; and
- wherein detecting a PIM device mapping error based on the comparison of the first identifier to the second identifier includes detecting the PIM device mapping error when the first PIM device identifier and the second PIM device identifier disagree.

19. The system of claim 16, where comparing the first identifier to the second identifier includes comparing a first thread identifier associated with the first PIM instruction to a second thread identifier associated with the second PIM instruction; and
- wherein detecting a PIM device mapping error based on the comparison of the first identifier to the second identifier includes detecting the PIM device mapping error when the first thread identifier and the second thread identifier disagree.

20. The apparatus of claim 14, wherein the divergence detection device is further configured to store the first PIM device identifier in response to an indication that the first PIM instruction begins a sequence of PIM instructions.

* * * * *